2,979,510
Patented Apr. 11, 1961

2,979,510
PREPARATION OF PYRIDINE

William I. Denton, Cheshire, Conn., assignor to Olin Mathieson Chemical Corporation, a corporation of Virginia No Drawing. Filed Nov. 13, 1958, Ser. No. 773,576

3 Claims. (Cl. 260—290)

This invention relates to the preparation of pyridine and, more particularly, to a novel catalytic process for the production of pyridine. This is a continuation-in-part of the application Serial Number 716,556, filed February 21, 1958, and now abandoned.

Pyridine is an industrially important chemical primarily useful as an intermediate in the preparation of other chemical compounds having important applications in the pharmaceutical and chemical industries. Pyridine itself is useful as a solvent for organic materials such as fats and mineral oils and as a catalyst in certain specific organic reactions such as the hydration of olefins and the sulfonation of alcohols.

Pyridine is currently produced from coal tar which is a by-product of coking operations. Since the supply of coal tar is dependent upon the amount of coke prepared, it is obvious that the amount of pyridine which can be obtained from this source is limited. Furthermore, the pyridine which is obtained as a by-product in the destructive distillation of coal tar is contaminated by various homologues which are formed at the same time. Hence, a separation problem is presented which entails considerable expense and inconvenience. Several synthetic methods for the preparation of pyridine have been reported. These generally involve either the reaction of acetaldehyde, methanol and ammonia or the reaction of oxygenheterocyclic compounds with ammonia. In general, these methods have been unsatisfactory because of the poor yields of pyridine returned and because of the presence of other nitrogen-heterocyclic compounds in a reaction mixture. Among such processes, tetrahydrofurfuryl alcohol has been reacted with ammonia in the presence of various catalytic agents. The most effective of the catalysts which have been employed in this reaction have been molybdena-alumina and chromia-alumina catalysts. Of these the molybdena-alumina returned the highest yield of pyridine but its use was accompanied by the formation of excessive amounts of coke. Hence, the period for effective use of this catalyst was limited and frequent regeneration of the catalyst was necessary. The useful life of a catalyst is to a large part determined by the degree of regenerating processing to which it must be subjected in order to preserve its catalytic activity at a desirably high level. The possibility of demands for increased quantities of pyridine have fostered attempts to improve upon those processes already known and to devise new methods for the preparation of pyridine.

It is an object of this invention to provide an improved process for the preparation of pyridine.

It is another object of this invention to provide an improved catalytic process for the preparation of pyridine.

A further object is to provide an improved catalyst for the preparation of pyridine.

Other objects will in part be obvious and will in part appear hereinafter.

It has been found that the above and other objects can be achieved by reacting tetrahydrofurfuryl alcohol and ammonia in the presence of a catalyst comprising a complex of the oxides of vanadium and molybdenum on a suitable neutral or basic support. The use of the above described catalysts provides a high yield of pyridine with minimum depositions of coke on the catalyst. The reduction of the amount of coke which is deposited on the catalyst greatly increases the useful life of the catalyst and means that less frequent regeneration is required. The operating advantages inherent in this feature are obvious. A further advantage following from the decrease in coke formation is the improvement in ultimate yield resulting from the fact that less of the expensive tetrahydrofurfuryl alcohol is converted to coke.

While the invention will be particularly described with reference to the use of certain complex mixed oxides of vanadium and molybdenum, the invention should not be construed as limited to the use of these particular complexes. It has been discovered that complex mixed oxides can be formed from any of the known oxides of vanadium and of molybdenum. Many examples of such mixed oxides can be found in the literature and particular reference is made to "Comprehensive Treatise on Inorganic and Theoretical Chemistry," volume IX, pages 780 and 781, by J. W. Mellor and "Properties of Heteropolymolybdates," Bulletin Cd b–12, October 1956, pages 12 and 13, Climax Molybdenum Company. All of the above mixed oxides display catalytic activity in the process of the invention.

In the preferred embodiment of the invention tetrahydrofurfuryl alcohol and ammonia in the mole ratio of 1 to 5 are reacted at a temperature of 525° C., at atmospheric pressure in the presence of a catalyst comprising 10% of a vanadia-molybdena complex on activated alumina, while introducing tetrahydrofurfuryl alcohol to the reaction zone at the rate of about 0.3 to 2.0 volumes per hour per unit volume of catalyst.

While the above conditions represent those which will be employed for achievement of optimum results, other proportions and operating conditions can be employed without departing from the spirit and scope of the invention as disclosed and claimed herein. Thus, the temperature can be varied from about 400° C. to about 600° C., although the preferred temperature of reaction is from about 475° C. to about 550° C. The particular temperature employed will, of course, depend to some degree upon the other conditions of reaction. For example, higher temperatures will be employed at short residence times whereas lower temperatures should be employed at longer residence times.

The reaction can be carried out under atmospheric, super-atmospheric and sub-atmospheric pressures. Pressures ranging from about 0.1 to about 20 atmospheres can be employed, although the preferred range of pressure is from about 0.5 to about 10 atmospheres.

The molar ratio of ammonia to tetrahydrofurfuryl alcohol can be varied over a range of from about 2 moles of ammonia to 1 mole of tetrahydrofurfuryl alcohol to about 10 moles of ammonia to 1 mole of tetrahydrofurfuryl alcohol. However, the preferred molar ratios of ammonia to tetrahydrofurfuryl alcohol are in the range of from about 3 to 1 to 7 to 1. At lower molar ratios the process operates satisfactorily but large amounts of the more expensive tetrahydrofurfuryl alcohol have to be processed, while at higher molar ratios the cost of handling and recovering additional ammonia becomes prohibitive.

Space velocity as used herein is liquid hourly space velocity. It is defined as the volume of tetrahydrofurfuryl alcohol, which is supplied to the reaction zone per hour per unit volume of catalyst employed. The space velocity can be varied from about 0.1 to about 10, and is preferably maintained at from 0.3 to 2.0. It should be noted that the space velocity is based upon the principal reactant and is therefore not necessarily related to residence time since variations in the molar ratios of reactants or in the pressure can change the residence time without affecting the space velocity.

The concentration of the active catalytic material on the support may vary from about 2% to about 25%. However, for optimum results it is preferred that from about 5% to 20% be employed. Higher concentrations give higher yields but the catalyst is more expensive and more subject to breakage. The ratio of vanadia to molybdena in the active material can be widely varied, proportions of from about 1 to 3 to about 3 to 1, respectively, having been found satisfactory.

The catalyst as actually employed comprises the active material on a suitable basic or neutral support. Supports which are particularly well adapted for use in carrying out the subject process are those basic or neutral catalysts which, when used in the subject process without a surface coating of active material, will produce a yield of more than 5% pyridine from tetrahydrofurfuryl alcohol. Examples of supports which may be employed as substrate for the catalysts used in the process of the present invention are basic or neutral supports, such as zinc spinels, basic aluminum phosphates, magnesia, bauxite and magnesia-silica. These supports have been used in the uncoated form in carrying out the steps of the preferred mode of the subject process and the following yields have been obtained.

TABLE I

| Support | Yield of Pyridine, Percent |
| --- | --- |
| Zinc Spinels | 12 |
| Basic Aluminum Phosphates | 17 |
| Magnesia | 8 |
| Bauxite | 16 |
| Magnesia-Silica | 5 |

By contrast when acid supports are coated with the vanadia-molybdena catalysts by the preferred method and used in the subject process, very low yields of pyridine, of the order of a few percent, have been obtained.

The use of the terms acid, basic, neutral, and non-acid with reference to supports in this description is intended to be a use of these terms as they are commonly understood in the art of materials of high surface area, as for example as they are used in the standard reference tests on catalysts by P. H. Emmett. Preferably, however, alumina will be used as the support and the use of activated alumina, in particular is preferred.

*Example I.—Vanadia-molybdena complex on activated alumina*

Twenty-five grams of ammonium para molybdate were dissolved in 500 cc. of distilled water and 50 cc. of ammonium hydroxide added. This mixture was then heated to 90° C. and 32 grams of ammonium meta vanadate were dissolved in the hot solution.

The hot solution was poured over 250 grams of 2-8 mesh activated alumina in an evaporating dish. Excess water was evaporated in the oven at 135-150° C. with stirring ever ten minutes. When dry, the catalyst was heated in a muffle furnace at 500° C. for 16-24 hours. Results obtained with this catalyst are shown in Table I.

*Example II.—Vanadia-molybdena complex on activated alumina*

*Solution A.*—Twenty-five grams of ammonium para molybdate were dissolved in 100 cc. of distilled water and 50 cc. of ammonium hydroxide. This solution was then distributed as evenly as possible over 250 grams of 4-8 mesh activated alumina. This material was dried at 150° C. for one hour.

*Solution B.*—Thirty-two grams of ammonium meta vanadate were dissolved in 400 cc. of distilled water at 90° C. Hot solution B was then poured over the alumina which was already impregnated with solution A. The solid catalyst was agitated as solution B was added in order to distribute solution B as evenly as possible. The resulting mixture was placed in evaporating dishes and evaporated to dryness at 150° C. The catalyst was stirred every 10-15 minutes to ensure even distribution of the solution. After it was dried, it was heated in a muffle furnace for 16 hours at 500° C.

Results obtained with these catalysts are compared with molybdena-alumina and vanadia-alumina in Table II. The results show that the vanadia-molybdena complex catalyst provides the optimum combination of high yield with low carbon deposition on the catalyst. Thus, at 525° C. the vanadia-molybdena catalyst gave only 2.5% coke compared to 4.2% for molybdena at the same yield level (run 4 vs. run 8). At the same temperature, the vanadia catalyst gave only 39% yield of pyridine compared to 44% for the vanadia-molybdena catalyst (run 4 vs. run 12). A similar picture is observed at 540-550° C. (run 6 vs. run 9, and run 6 vs. run 13). The commercial advantages are obvious since the catalyst gives maximum yields while allowing for employment for extended periods of time before becoming so poisoned as to require regeneration. The savings in labor costs and maintenance which result are very considerable. In addition, the reduced conversion of the expensive tetrahydrofurfuryl to coke results in improved ultimate yields and lower raw materials costs.

TABLE II

COMPARISON OF VANADIA, MOLYBDENA AND VANADIA-MOLYBDENA CATALYSTS

| Catalyst a | Vanadia-Molybdena on Alumina | | | | | | 10% Molybdena-Alumina | | | 10% Vanadia-Alumina | | | |
| --- | --- | --- | --- | --- | --- | --- | --- | --- | --- | --- | --- | --- | --- |
| Prep | I | II | II | I | II | I | | | | | | | |
| Run No | 1 | 2 | 3 | 4 | 5 | 6 | 7 | 8 | 9 | 10 | 11 | 12 | 13 |
| Temp., °C | 475 | 475 | 500 | 525 | 525 | 540 | 450 | 525 | 550 | 475 | 500 | 525 | 550 |
| Yield, Mol Percent Based on THFA: | | | | | | | | | | | | | |
| Pyridine | 22 | 32 | 33 | 44 | 43 | 39 | 35 | 45 | 22 | 23 | 34 | 39 | 34 |
| Coke on Catalyst | 1.6 | 1.9 | 1.6 | 2.7 | 2.7 | 2.9 | 4.0 | 4.2 | 7.6 | 1.7 | 1.9 | 2.4 | 2.8 | a 3 hour runs; atmospheric pressure; 5 NH₃: 1 THFA; liquid hourly space velocity—one vol. THFA per hour per volume catalyst; all catalysts on an activated alumina support.

In order to provide a fuller understanding of the present invention reference is made to the following specific examples. It is to be understood, however, that these examples do not in any way limit the scope of the invention.

Since many examples of the foregoing procedures and compositions may be carried out and made, and since many modifications can be made in the procedures and articles described without departing from the scope of the subject invention, the foregoing is to be interpreted as illustrative only, and not as defining or limiting the scope of the invention.

The invention having been disclosed, what is claimed to be new and desired to be secured by Letters Patent is:

1. The process for the preparation of pyridine in which ammonia and tetrahydrofurfuryl alcohol are reacted in the molar ratio of from 2 to 1 to 10 to 1 at a temperature of from about 450° C. to 600° C., a pressure of from about 0.1 to about 20 atmospheres, and a space velocity from about 0.1 to about 10 in the presence of from about 1 to 25% of a catalyst consisting essentially of a complex of a molybdenum oxide with a vanadium oxide on a support selected from the group consisting of neutral and basic oxides capable of producing at least a 5% yield of pyridine from said reaction.

2. The process according to claim 1 in which the molybdenum oxide is molybdenum trioxide.

3. The process according to claim 2 in which the support is activated alumina.

References Cited in the file of this patent

UNITED STATES PATENTS 2,543,424   Spillane et al. _____ Feb. 27, 1951

OTHER REFERENCES

Drake et al.: J. Am. Chem. Soc., vol. 52, col. 4558–66 (1930).